US010108320B2

(12) United States Patent
Klein

(10) Patent No.: US 10,108,320 B2
(45) Date of Patent: Oct. 23, 2018

(54) MULTIPLE STAGE SHY USER INTERFACE

(71) Applicant: Microsoft Corporation, Redmond, WA (US)

(72) Inventor: Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

(21) Appl. No.: 14/509,270

(22) Filed: Oct. 8, 2014

(65) Prior Publication Data
US 2016/0103584 A1 Apr. 14, 2016

(51) Int. Cl.
G06F 3/01 (2006.01)
G06F 3/0484 (2013.01)
G06F 3/0482 (2013.01)
G06F 3/0488 (2013.01)
G06F 3/00 (2006.01)

(52) U.S. Cl.
CPC .......... G06F 3/04842 (2013.01); G06F 3/016 (2013.01); G06F 3/0482 (2013.01); G06F 3/0488 (2013.01); G06F 2203/04108 (2013.01)

(58) Field of Classification Search
CPC .... G06F 3/0488; G06F 3/04842; G06F 3/016; G06F 3/0482
See application file for complete search history.

(56) References Cited

U.S. PATENT DOCUMENTS

| 7,653,883 | B2 | 1/2010 | Hotelling et al. |
| 8,196,042 | B2* | 6/2012 | Hinckley ............ G06F 3/04883 |
| | | | 715/708 |
| 8,219,936 | B2 | 7/2012 | Kim et al. |
| 2002/0015064 | A1 | 2/2002 | Robotham et al. |
| 2003/0011638 | A1 | 1/2003 | Chung |
| 2008/0229223 | A1* | 9/2008 | Kake ..................... G06F 3/0481 |
| | | | 715/764 |
| 2010/0107099 | A1 | 4/2010 | Frazier et al. |

(Continued)

FOREIGN PATENT DOCUMENTS

EP 2631755 A1 8/2013

OTHER PUBLICATIONS

"Second Written Opinion Issued in PCT Application No. PCT/US2015/054105", dated Sep. 15, 2016, 7 Pages.
(Continued)

*Primary Examiner* — Nicholas Augustine
(74) *Attorney, Agent, or Firm* — Holzer Patel Drennan

(57) ABSTRACT

Human device interactions are improved by revealing user interface (UI) elements or functionality on a device in multiple context-dependent stages based on discerning a user's intent. Three dimensional sensors that detect the presence, position, orientation, direction, or rate of travel of a pointer with respect to a device may provide indicia of the user's intent to interact with a UI element on the device. If the user was not actively navigating on the device, then context relevant UI elements or actions that were not previously displayed may be surfaced and displayed elements may be removed. If the user then maintains or narrows their focus on or near a particular UI element that was just revealed, a second or subsequent layer of UI elements or effects may be surfaced. Subsequent deeper layers in a multi-stage shy UI hierarchy may be presented as the user interacts with the surfaced elements.

20 Claims, 17 Drawing Sheets

(56) References Cited

U.S. PATENT DOCUMENTS

| | | |
|---|---|---|
| 2010/0169832 A1 | 7/2010 | Chang |
| 2012/0320080 A1 | 12/2012 | Giese et al. |
| 2013/0019173 A1* | 1/2013 | Kotler .................. G06F 3/0482 715/711 |
| 2013/0019174 A1* | 1/2013 | Gil ..................... G06F 3/04812 715/711 |
| 2013/0019175 A1* | 1/2013 | Kotler .................. G06F 3/0482 715/728 |
| 2013/0019182 A1* | 1/2013 | Gil ...................... G06F 3/0482 715/738 |
| 2013/0019208 A1* | 1/2013 | Kotler ................ G06F 3/04812 715/835 |
| 2013/0086056 A1* | 4/2013 | Dyor ..................... G06F 3/167 707/730 |
| 2013/0132904 A1* | 5/2013 | Primiani ............ G06F 3/04886 715/834 |
| 2013/0174093 A1* | 7/2013 | Peters .................. G06F 3/0482 715/834 |
| 2013/0191781 A1* | 7/2013 | Radakovitz .......... G06F 9/4443 715/810 |
| 2013/0325341 A1 | 12/2013 | van Os et al. |
| 2013/0339904 A1 | 12/2013 | Geithner |
| 2014/0149935 A1 | 5/2014 | Johnson et al. |
| 2014/0165003 A1* | 6/2014 | Branton ................ G06F 3/0488 715/835 |
| 2014/0195979 A1* | 7/2014 | Branton ................ G06F 3/0482 715/834 |

OTHER PUBLICATIONS

"International Preliminary Report on Patentability Issued in PCT Application No. PCT/US2015/054105", dated Dec. 19, 2016, 8 Pages.

McAllister, Shep, "Hovering Gestures Brings Touchless Controls to Any Android Phone", Published on: Sep. 2, 2013, Available at: http://lifehacker.com/hovering-gestures-brings-touchless-controls-to-any-andr-1235874503.

"International Search Report & Written Opinion Issued in PCT Application No. PCT/US2015/054105", dated Jan. 15, 2016, 11 Pages.

* cited by examiner

MULTIPLE STAGE SHY USER INTERFACE

BACKGROUND

Computers have displays with which users interact. The displays generally have visual affordances like buttons, links, or other user interface (UI) controls. These visual affordances are an important usability aid in any user interface. Without the visual affordances, the user may not know what interactions are possible or how to use the device. Thus, displays tend to present UI elements in a persistent manner. However, there are situations where showing persistent UI "chrome" (e.g., buttons, icons) is undesirable. For example, all of the real estate available on the display of a device may be desired for displaying content, particularly for smaller devices (e.g., smart phones).

Conventional approaches attempt to address the issue of limited screen space being consumed by persistent UI chrome by temporarily suppressing the UI elements when the system determines that the elements are not needed. Conventional approaches may selectively surface the UI elements when the system determines that the elements may be needed. For example, the system may accept a user input (e.g., swipe gesture from left side of screen to right side of screen) to surface the UI elements. These recall interactions are slow and may require the user to learn an abstract and hidden interaction just to reveal the UI elements.

Some conventional systems interpret some intuitive user actions as being a request to display a UI element. For example, when a user is watching a video on a smart phone, if the smart phone detects a touch on the screen, the video application, operating system, application, or smart phone may surface DVR-like controls for controlling the application. When the user touches the screen on which the movie is playing the user may be presented with buttons including start, stop, skip back, and skip forward. While these "interact with the screen" interfaces are an improvement over abstract or hidden interactions, the user/device interaction tends to be a single-step interaction having a small finite set of possibilities that present a fixed single level of user interface elements.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods improve over conventional approaches to human-to-device interaction by revealing UI elements or functionality in multiple context-dependent stages based on discerning a user's intent. Example apparatus and methods may rely on three dimensional (3D) touch or hover sensors that detect the presence, position, orientation, direction of travel, or rate of travel of a pointer (e.g., user's finger, implement, stylus, pen). The 3D sensors may provide information from which a determination can be made concerning at which object, element, or region of an interface a user is pointing, gesturing, or otherwise interacting with or indicating an intent to interact with. If the user had not been actively navigating on the device, then example apparatus and methods may surface (e.g., display) context relevant UI elements or actions that were not previously displayed. For example, if a user is watching a video, then a top layer of video control elements may be displayed. Unlike conventional systems, if the user then maintains or narrows their focus on or near a particular UI element that was just revealed, a second or subsequent layer of video control elements or effects may be surfaced. Subsequent deeper layers in a hierarchy may be presented as the user interacts with the surfaced elements.

Example apparatus and methods may facilitate improved, faster, and more intuitive interactions with a wider range of UI elements, controls, or effects without requiring persistent onscreen affordances or hidden gestures that may be difficult to discover or learn. Single layer controls that are revealed upon detecting a screen touch or gesture are well known. These controls that are selectively displayed upon detecting a screen touch or gesture may be referred to as "shy" controls. Example apparatus and methods improve on these single layer touch-based approaches by providing multi-layer shy controls and effects that are revealed in a context-sensitive manner based on inputs including touch, hover, tactile, or voice interactions. Hover sensitive interfaces may detect not just the presence of a user's finger, but also the angle at which the finger is pointing, the rate at which the finger is moving, the direction in which the finger is moving, or other attributes of the finger. Thus, rather than a binary {touch: yes/no} state detection, a higher order input space may be analyzed to determine a user's intent with respect to a user interface element. 3D proximity detectors may determine which object or screen location the user intends to interact with and may then detect and characterize multiple attributes of the interaction.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods improve over conventional approaches to human-to-device interaction by providing a multi-stage shy user interface (MSSUI) that allows a user to operate on the assumption that simply approaching the screen with a pointer will reveal all necessary and relevant information for a given context.

Figure 1:
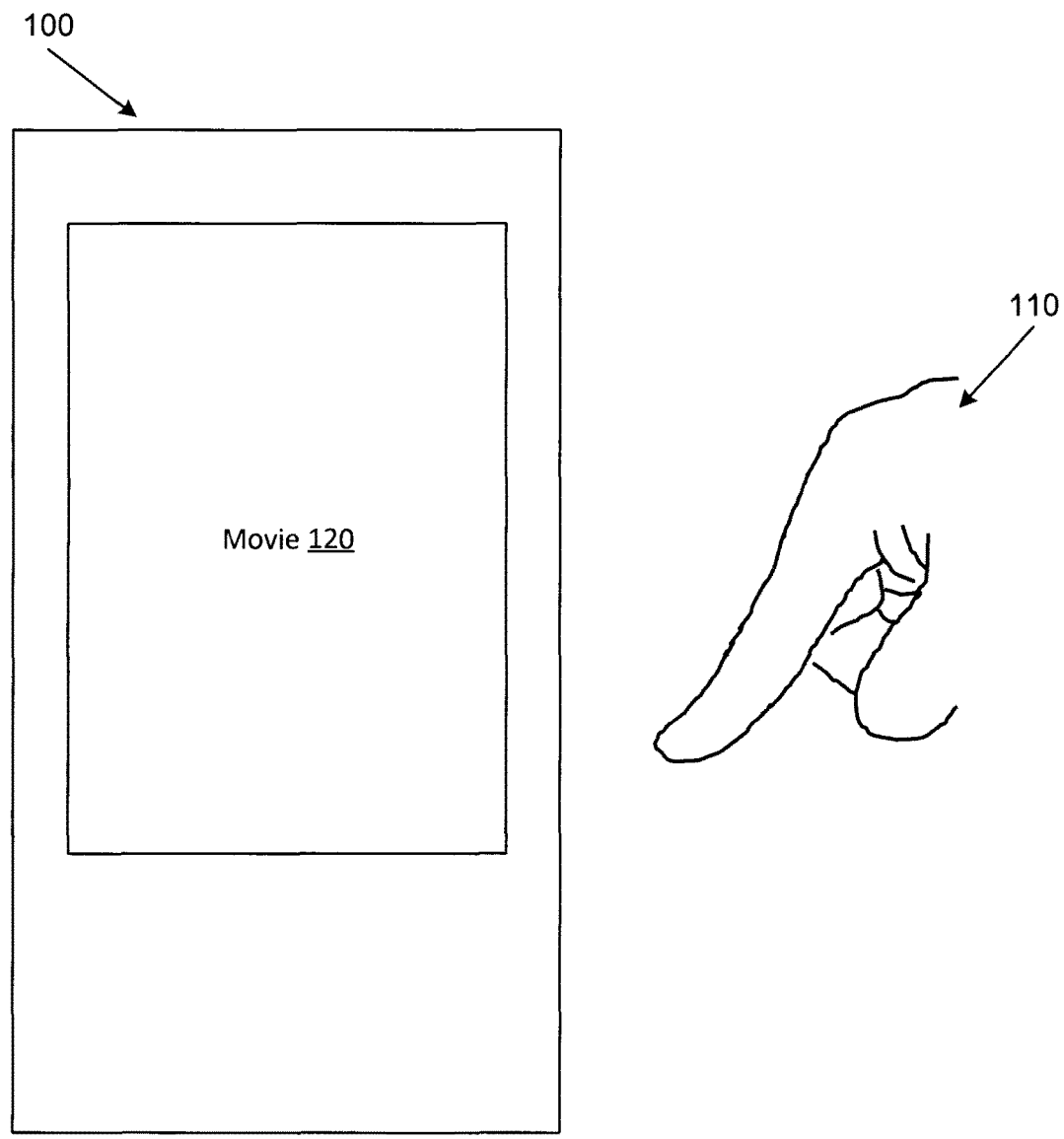
FIG. 1 illustrates an example device that is not displaying any user interface elements.

FIG. 1 illustrates a device 100 that is displaying no user interface elements. A movie 120 may be playing on device 100. A user may have their finger 110 positioned away from device 100 and thus the finger 110 may not be interacting with device 100 or movie 120.

Figure 2:
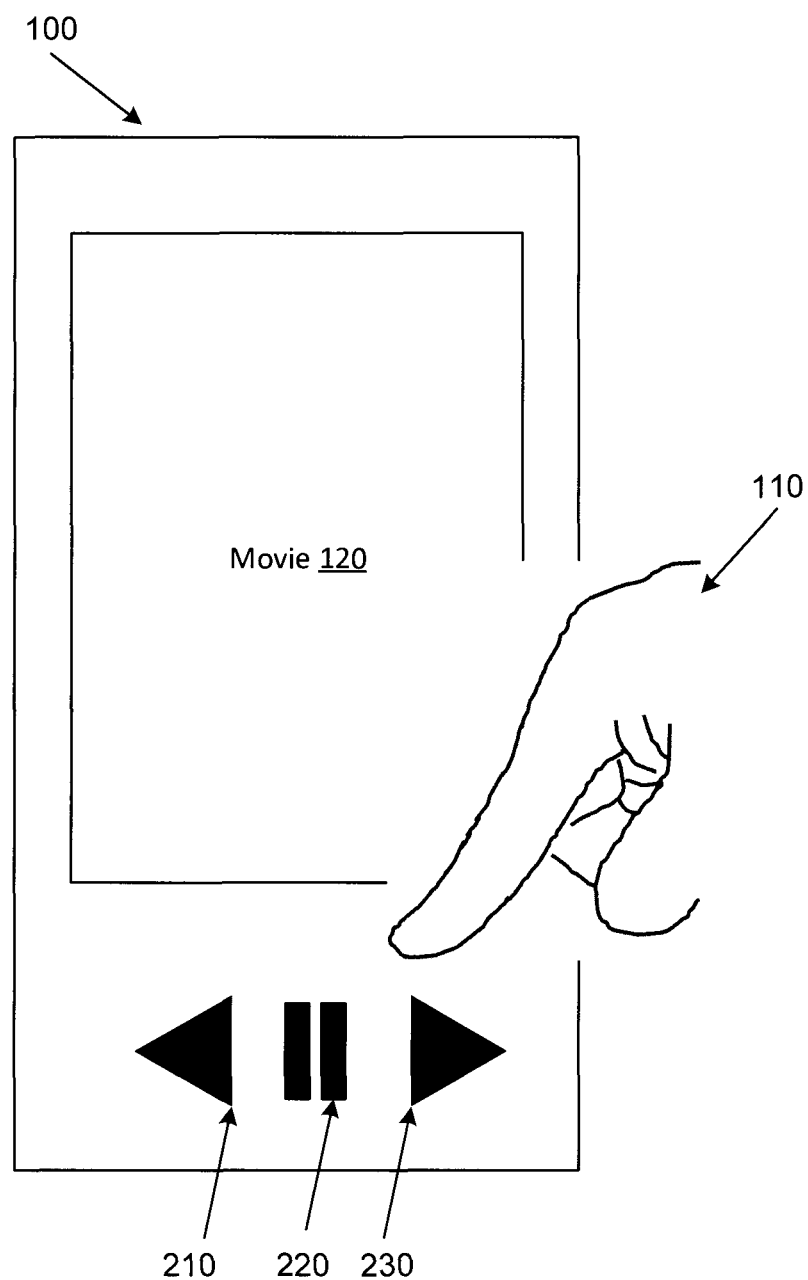
FIG. 2 illustrates an example device displaying a first level of user interface elements from a multi-stage shy user interface (MSSUI).

FIG. 2 illustrates device 100 displaying a first level of user interface elements from an MSSUI. As finger 110 approached device 100, user interface element 210, user interface element 220, and user interface element 230 were presented to the user. User interface elements 210, 220, and 230 may represent the top layer of an MSSUI. User interface elements 210, 220, and 230 may represent the actions that are most likely to be relevant to a user interaction with movie 120 or device 100 at a certain point in time. The user interaction may depend, at least in part, on a user interaction context that in turn depends, at least in part, on state associated with device 100, an operating system, an application (e.g., movie viewer), or an object (e.g., movie 120) displayed on device 100.

Figure 3:
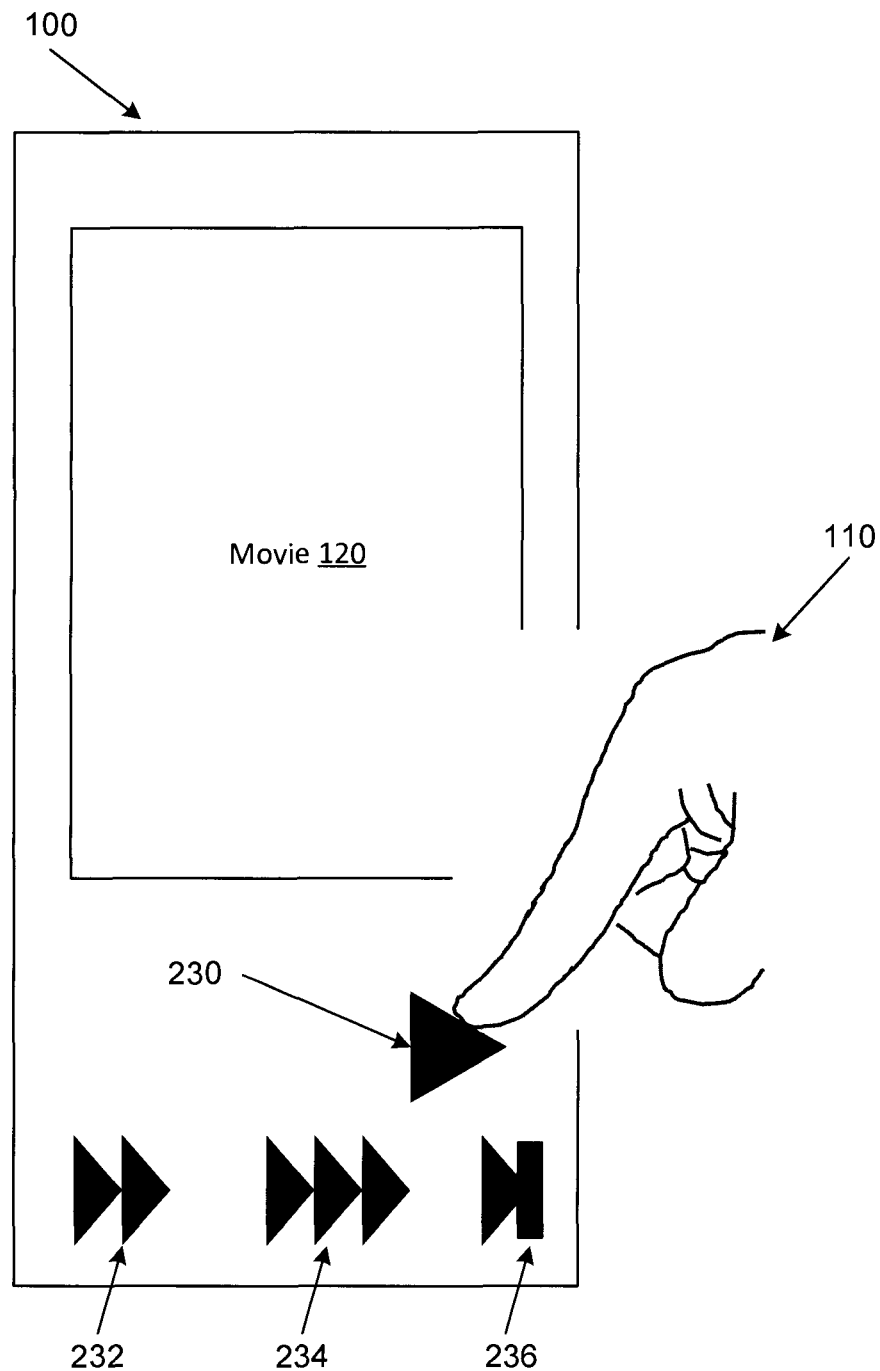
FIG. 3 illustrates an example device displaying a second level of user interface elements from an MSSUI.

FIG. 3 illustrates device 100 after the user has positioned their finger 110 near user interface element 230. While user interface element 230 may generally describe a "move forward" action, example apparatus and methods allow a more refined and intuitive approach to moving forward. For example, in response to the user hovering over element 230 for a pre-determined period of time or touching element 230, user interface element 232, user interface element 234, and user interface element 236 may be surfaced on the display. User interface elements 220 and 210 may be removed from the display. User interface element 232 will allow the user to move forward in the movie 120 at a first rate, user interface element 234 may allow the user to move forward in the movie 120 at a second rate, and user interface element 236 may allow the user to move all the way to the end of movie 120. In one embodiment, user interface element 230 may also have been removed from the display.

Figure 4:
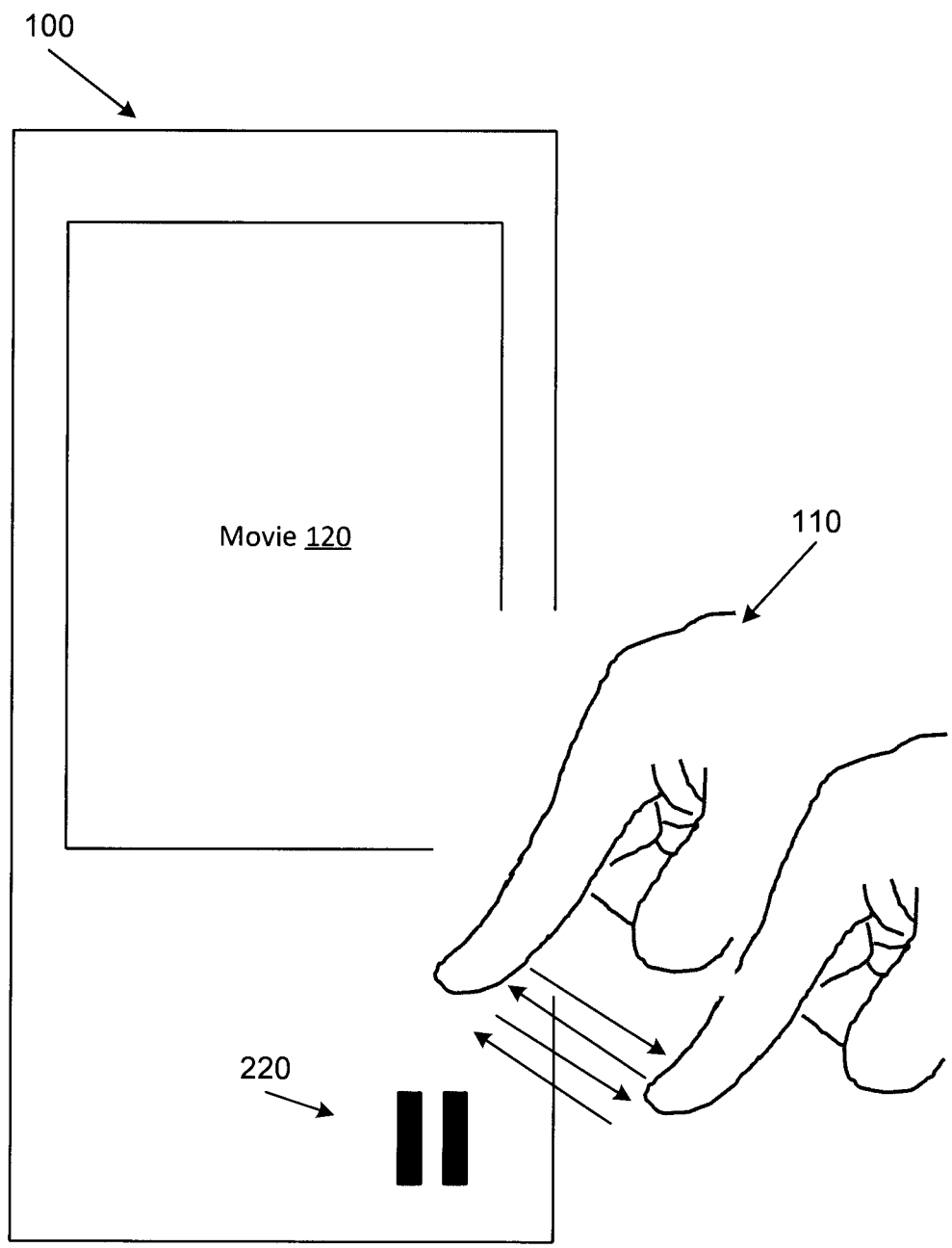
FIG. 4 illustrates an example device displaying an effect associated with a user interface element from an MSSUI.

FIG. 4 illustrates device 100 displaying an effect applied to an element from an MSSUI. The user may move their finger 110 back and forth over user interface element 220 to indicate that they want to stop the movie 120 and then to move frame by frame. Whether the movie 120 moves forward or backward may be determined by different rates at which finger 110 moves in different directions, whether finger 110 is on the right side or left side of element 220, or based on other attributes. While moving finger 110 back and forth is described, other gestures or interactions may be employed. For example, finger 110 may describe circles or other shapes over or near a user interface element, or finger 110 may move toward or away from the device 100.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
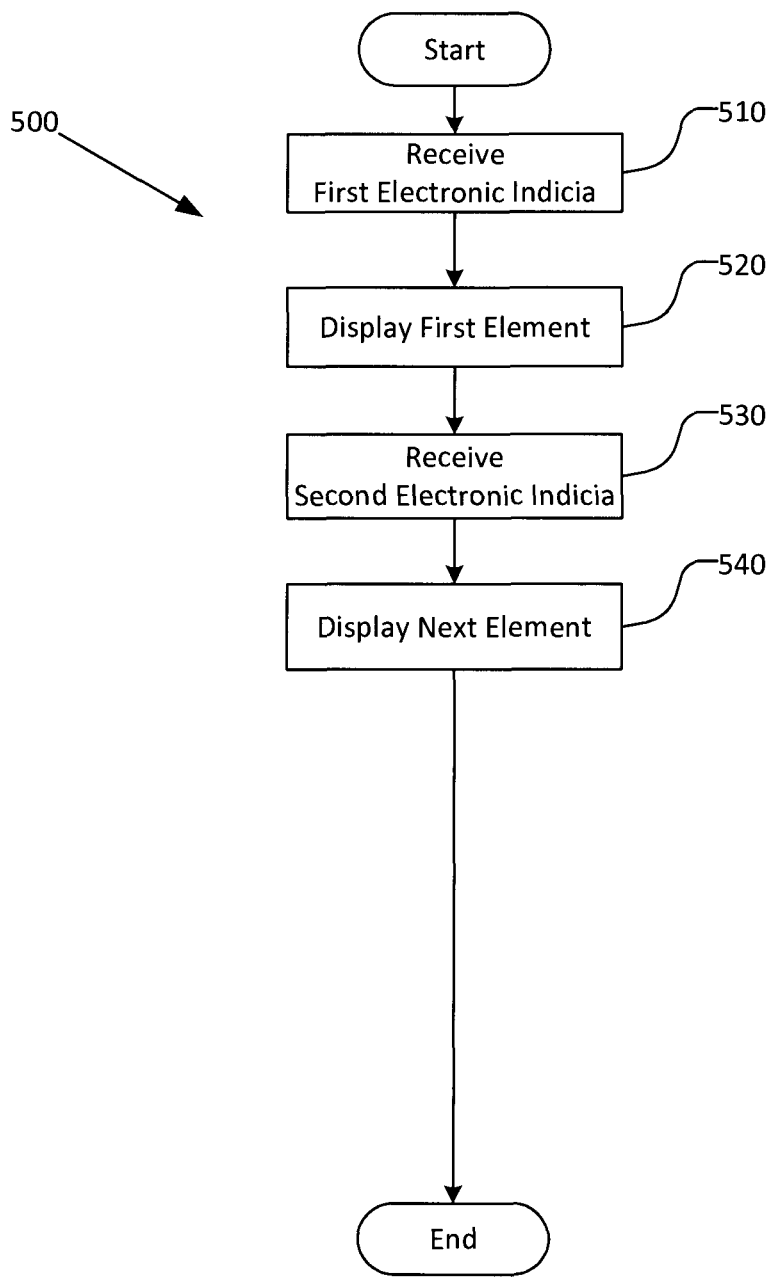
FIG. 5 illustrates an example method associated with managing an MSSUI.

FIG. 5 illustrates an example method 500 for managing a multiple stage shy user interface (MSSUI). Method 500 presents MSSUI elements on a display on a device. Method 500 includes, at 510, receiving first electronic indicia of a user's intent to interact with a first level of the multi-stage shy UI. Once the first electronic indicia has been received, method 500 includes, at 520, selectively displaying on the display a first element that is not currently displayed on the display. The first element may be associated with the first level of the MSSUI. The first element may be selected based, at least in part, on the first electronic indicia and a user interaction context.

The first electronic indicia may take different forms. In one embodiment, the first electronic indicia may be a hover event generated in response to a pointer approaching the display or the pointer pointing to a pre-defined portion of the display. The pointer may be, for example, a user's finger, a pen, a stylus, or other implement. The pointer may be an active (e.g., LED) or passive (e.g. finger) item. The pre-defined position may be a fixed position (e.g., bottom third of display) or may be a relative position (e.g., within one inch of the largest item displayed on screen). In computing, an event is an action or occurrence detected by a program that may be handled by the program. Typically, events are handled synchronously with the program flow. When handled synchronously, the program may have a dedicated place where events are handled. Events may be handled in, for example, an event loop. Typical sources of events include users pressing keys, touching an interface, performing a gesture, or taking another user interface action. Another source of events is a hardware device such as a timer. A program may trigger its own custom set of events. A computer program that changes its behavior in response to events is said to be event-driven.

In different embodiments the first electronic indicia may include a touch event generated in response to the pointer touching the display, a gesture event generated in response to the pointer making a touch or hover gesture associated with the display, a tactile event generated in response to the user moving (e.g., shaking) the device, or a speech event generated in response to the user verbally interacting with the device. The first electronic indicia may be provided as, for example, a value in a register, a value in memory, a voltage on a signal line, a current on a signal line, or other electronic signal. The first electronic indicia may provide position information and may provide initiating (e.g., start now) information. Thus, rather than persistently displaying user interface chrome, method 500 allows the on-demand display of user interface elements in response to a user initiating action.

The user interaction context may concern, for example, a task being performed on the device as controlled, at least in part, by the user. The user interaction context may describe, for example, state information associated with an operating system, an application, an event handler, or other process running on the device. The user interaction context may also describe, for example, state information associated with navigation through the MSSUI. In one embodiment, the user interaction context may be determined, at least in part, by a set of objects currently displayed on the display. Additionally or alternatively, the user interaction context may be determined, at least in part, by a relationship between the pointer and one or more objects displayed on the display.

Method 500 includes, at 530, receiving second electronic indicia of the user's intent to interact with a second, different level of the multi-stage shy UI. When the second electronic indicia is received, method 500 may, at 540, selectively display a second element that is not currently displayed on the display. The second element may be associated with a portion of the second level of the MSSUI. Unlike conventional systems that may display an entire UI hierarchy or that may display an entire level of a UI hierarchy, method 500 conserves display space by only displaying selected relevant portions of a UI hierarchy. Thus, the second element may be selected based, at least in part, on the second electronic indicia and the user interaction context. While a "second" element is described, one skilled in the art will appreciate that "second" refers to another, different element (e.g., a subsequent element).

The portion of the second level that is selected may depend, at least in part, on the first element. For example, a first user interface element on a first level of the MSSUI may have three sub-elements in a second level and a second user interface element on the first level may have five sub-elements in a second level. When a user is interacting with the first element a preview of the three sub-elements may be available, and while when the user is interacting with the second element a preview of the five sub-elements in the second level may be available. When the user interacts with one of the sub-elements, the element on the first level may be removed from the display.

The second electronic indicia may take different forms. In one embodiment, the second electronic indicia may be a hover event generated in response to the pointer approaching the display, in response to the pointer maintaining a relationship with the first element, in response to the pointer pointing to a pre-defined location on the display, or in response to the pointer establishing a relationship with an object displayed on the display.

In another embodiment, the second electronic indicia may include a touch event generated in response to the pointer touching the display, a gesture event generated in response to the pointer making a touch or hover gesture associated with the display, a tactile event generated in response to the user moving the device, or a speech event generated in response to the user verbally interacting with the device.

Figure 6:
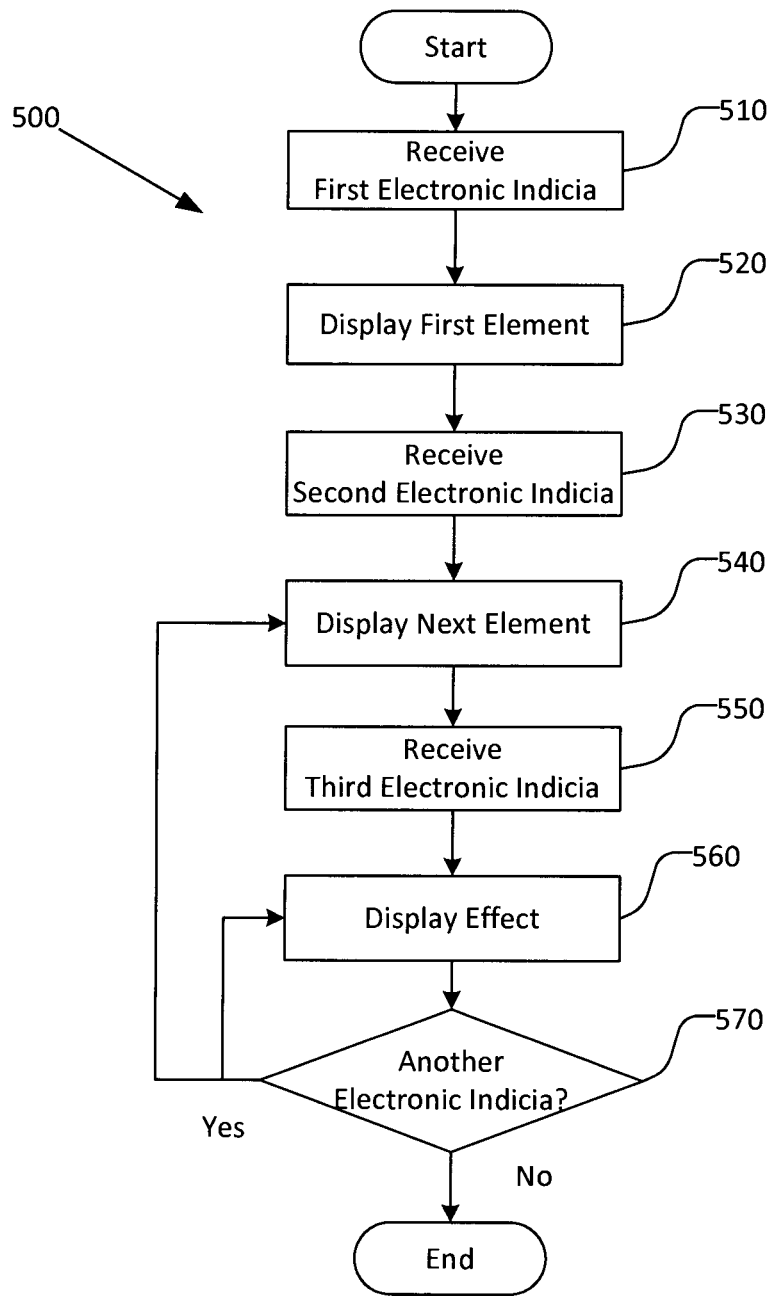
FIG. 6 illustrates an example method associated with managing an MSSUI.

FIG. 6 illustrates another embodiment of method 500. This embodiment includes additional actions. In addition to navigating an MSSUI to be able to find different actions, a user may interact with currently available actions, icons, or objects to produce different effects. Thus, this embodiment of method 500 also includes, at 550, receiving third electronic indicia of the user's intent to apply an effect to the first element, the second element, or to an object displayed on the display. Once the third electronic indicia has been received, method 500, at 560, selectively applies the effect to the first element, to the second element, or to the object. The effect that is applied and even the manner in which it is applied may be based, at least in part, on the third electronic indicia and the user interaction context.

Like the first electronic indicia and the second electronic indicia, the third electronic indicia may take different forms including, for example, a hover event generated in response to the pointer approaching the display, in response to the pointer maintaining a relationship with the first element, in response to the pointer pointing to a pre-defined location on the display, or in response to the pointer establishing a relationship with an object displayed on the display. The third electronic indicia may also include a touch event generated in response to the pointer touching the display, a gesture event generated in response to the pointer making a touch or hover gesture associated with the display, a tactile event generated in response to the user moving the device, or a speech event generated in response to the user verbally interacting with the device.

The effect that is selected may be, for example, a light source position effect, a zoom effect, a lens effect, a scroll effect, an animation effect, a preview operation, or a reveal next level of multi-stage shy UI effect. How the effect is applied may be determined, at least in part, by a position or three dimensional position of the pointer, an angle of the pointer, an orientation of the pointer, a movement of the pointer, or a velocity of the pointer.

In one embodiment, the effect is a data reveal effect that reveals a portion of a complex data set. The complex data set may be, for example, a multi-layer map. The portion of the complex data set that is revealed may be selected based on the pointer. For example, the portion selected may be a function of a position of the pointer with respect to an object that represents the complex data set, an angle of the pointer with respect to an object that represents the complex data set, an orientation of the pointer with respect to an object that represents the complex data set, a movement of the pointer with respect to an object that represents the complex data set, or a velocity of the pointer with respect to an object that represents the complex data set.

This embodiment also includes, at 570, detecting additional inputs. The additional inputs may be associated with traversing up or down in the MSSUI or applying different effects to different objects. Recall that the MSSUI has multiple stages. For example, the MSSUI may have two, three, four, or even more layers. Thus, the actions of selecting a subsequent element based on a previous element and interactions with the previous element may be applied recursively to navigate to lower levels or to travel back up to higher levels. Therefore, method 500 includes, at 570, upon receiving subsequent electronic indicia of the user's intent to interact with a subsequent level of the MSSUI, returning control to 540 or 560 and selectively displaying on the display a subsequent element that is not currently displayed on the display or applying another effect. The subsequent element is associated with a portion of a subsequent level of the multi-stage shy UI. The portion of the subsequent level depends, at least in part, on a previous element displayed on the display. The subsequent element is selected based on the subsequent electronic indicia, the previous element, and the user interaction context.

While FIGS. 5 and 6 illustrate various actions occurring in serial, it is to be appreciated that various actions illustrated in FIGS. 5 and 6 could occur in parallel or substantially in parallel. By way of illustration, a first process could handle input events, a second process could select elements to display and remove, and a third process could apply effects to displayed elements. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer, phone, tablet) cause the machine to perform methods described or claimed herein including method 500. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
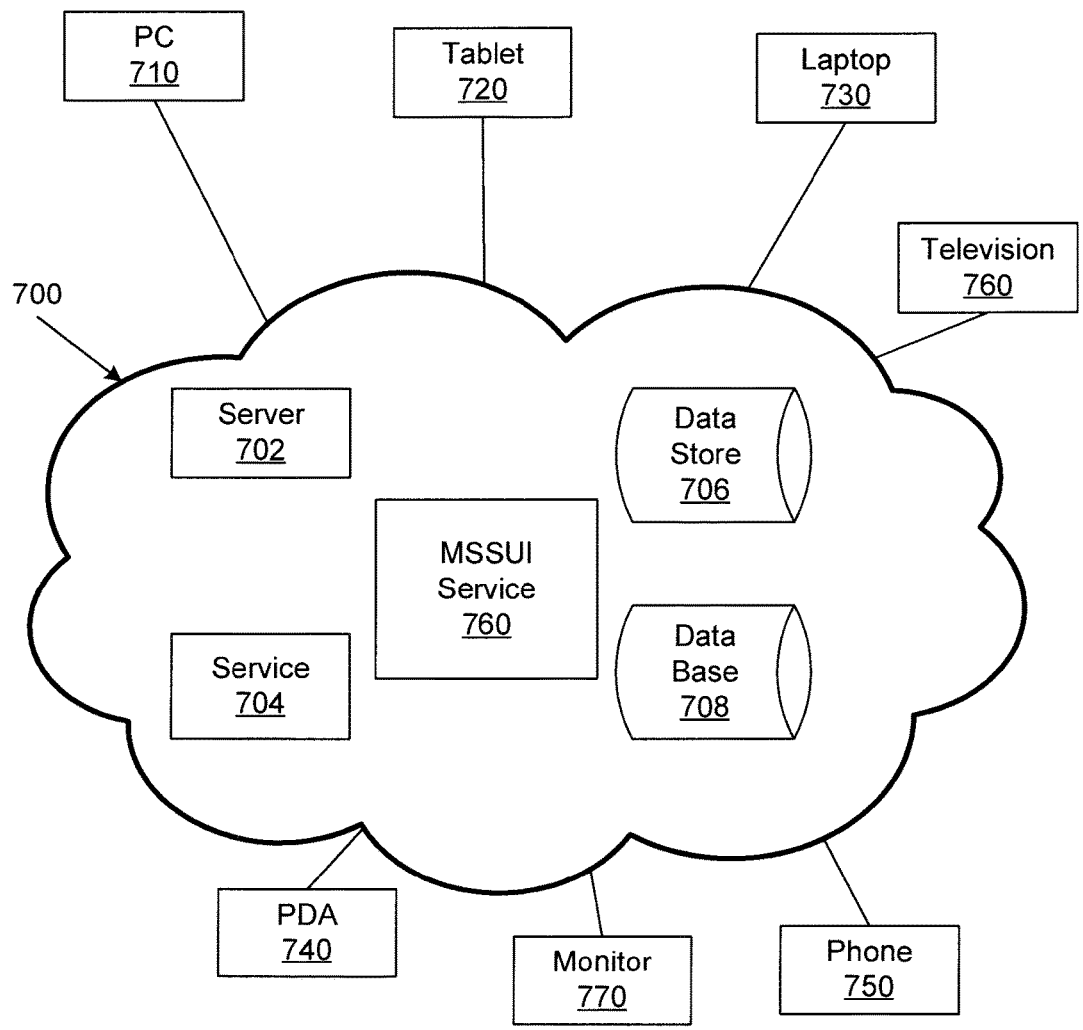
FIG. 7 illustrates an example cloud operating environment in which an MSSUI may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example multiple stage shy user interface (MSSUI) service 760 residing in the cloud 700. The MSSUI service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud 700 and may, therefore, be used by the MSSUI service 760.

FIG. 7 illustrates various devices accessing the MSSUI service 760 in the cloud 700. The devices include a computer 710, a tablet 720, a laptop computer 730, a desktop monitor 770, a television 760, a personal digital assistant 740, and a mobile device (e.g., cellular phone, satellite phone) 750. It is possible that different users at different locations using different devices may access the MSSUI service 760 through different networks or interfaces. In one example, the MSSUI service 760 may be accessed by a mobile device 750. In another example, portions of MSSUI service 760 may reside on a mobile device 750. MSSUI service 760 may perform actions including, for example, establishing a speech reference point and processing a multi-modal command in the context associated with the speech reference point. In one embodiment, MSSUI service 760 may perform portions of methods described herein (e.g., method 500).

Figure 8:
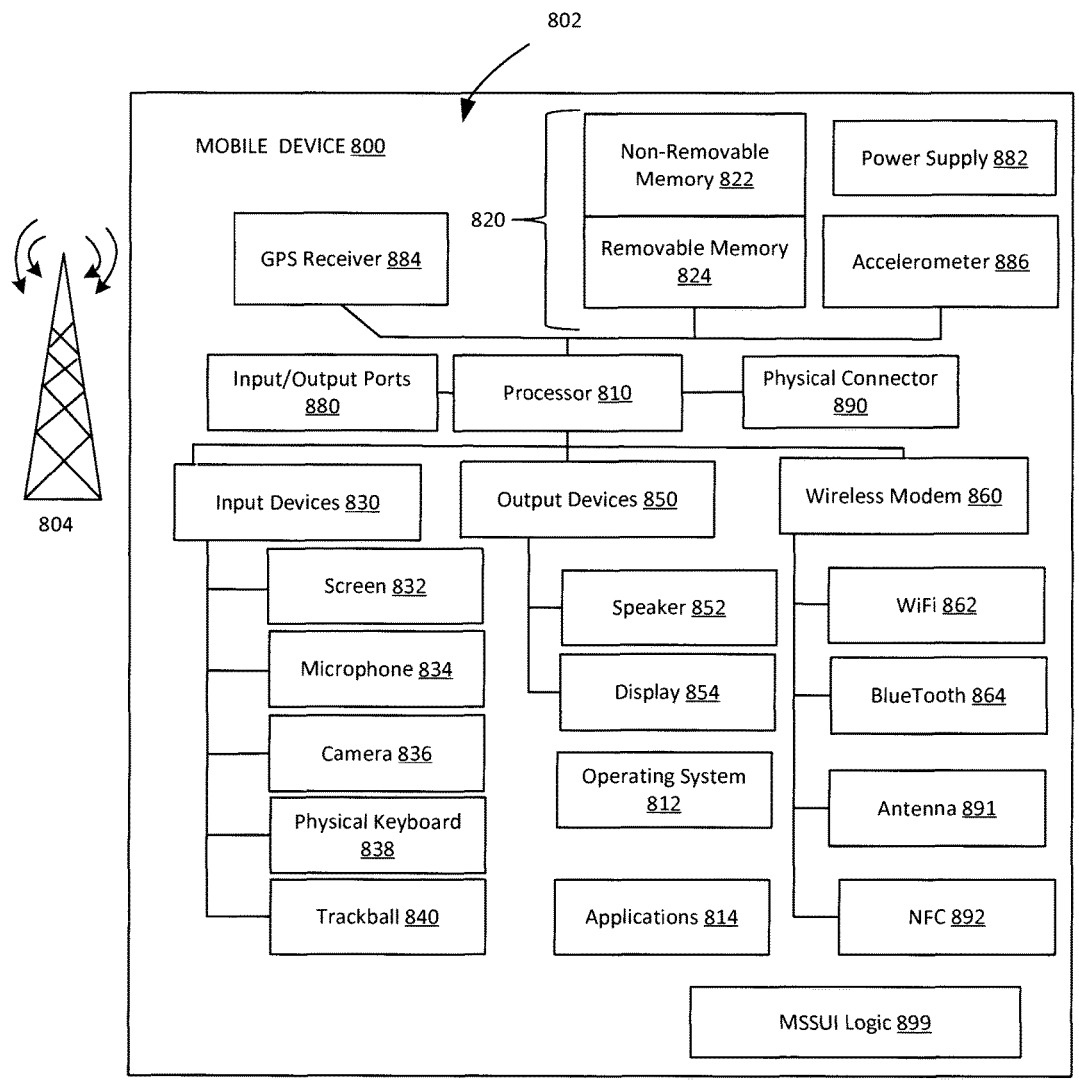
FIG. 8 is a system diagram depicting an exemplary mobile communication device that may support an MSSUI.

FIG. 8 is a system diagram depicting an exemplary mobile device 800 that includes a variety of optional hardware and software components shown generally at 802. Components 802 in the mobile device 800 can communicate with other components, although not all connections are shown for ease of illustration. The mobile device 800 may be a variety of computing devices (e.g., cell phone, smartphone, tablet, phablet, handheld computer, Personal Digital Assistant (PDA), etc.) and may allow wireless two-way communications with one or more mobile communications networks 804, such as a cellular or satellite networks. Example apparatus may concentrate processing power, memory, and connectivity resources in mobile device 800 with the expectation that mobile device 800 may be able to manage the display of elements from an MSSUI.

Mobile device 800 can include a controller or processor 810 (e.g., signal processor, microprocessor, application specific integrated circuit (ASIC), or other control and processing logic circuitry) for performing tasks including input event handling, output event generation, signal coding, data processing, input/output processing, power control, or other functions. An operating system 812 can control the allocation and usage of the components 802 and support application programs 814. The application programs 814 can include media sessions, mobile computing applications (e.g., email applications, calendars, contact managers, web browsers, messaging applications), video games, movie players, television players, productivity applications, or other applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include an operating system context, an application context, a navigation point in an MSSUI, a touch point location, a hover point location, pointer attributes (e.g., position, angle, direction of travel, rate of travel, type of pointer), or other information. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a screen 832 that is both touch and hover-sensitive, a microphone 834, a camera 836, a physical keyboard 838, or trackball 840. The mobile device 800 may also support output devices 850 including, but not limited to, a speaker 852 and a display 854. Display 854 may be incorporated into a touch-sensitive and hover-sensitive i/o interface. Other possible input devices (not shown) include accelerometers (e.g., one dimensional, two dimensional, three dimensional), gyroscopes, light meters, and sound meters. Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electroencephalogram (EEG) and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting touch and hover gestures associated with controlling output actions.

A wireless modem 860 can be coupled to an antenna 891. In some examples, radio frequency (RF) filters are used and the processor 810 need not select an antenna configuration for a selected frequency band. The wireless modem 860 can support one-way or two-way communications between the processor 810 and external devices. The communications may concern media or media session data that is provided as controlled, at least in part, by MSSUI logic 899. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global System for Mobile Communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include an MSSUI logic 899 that provides functionality for the mobile device 800. For example, MSSUI logic 899 may provide a client for interacting with a service (e.g., service 760, FIG. 7). Portions of the example methods described herein may be performed by MSSUI logic 899. Similarly, MSSUI logic 899 may implement portions of apparatus described herein. In one embodiment, MSSUI logic 899 may establish a navigation point in an MSSUI and determine which elements from the MSSUI are to be displayed and which effects, if any, are to be applied to the elements.

In one embodiment, MSSUI logic 899 may implement a portion of a system that controls the presentation and appearance of user interface elements from a multi-stage shy user interface in response to the detected actions so that less than five percent of the display is occupied by user interface control elements and so that at least ten percent of the commands or user interface control elements that are available through the multi-stage shy user interface is displayed. Other amounts of screen real estate and MSSUI functionality may be used.

Figure 9:
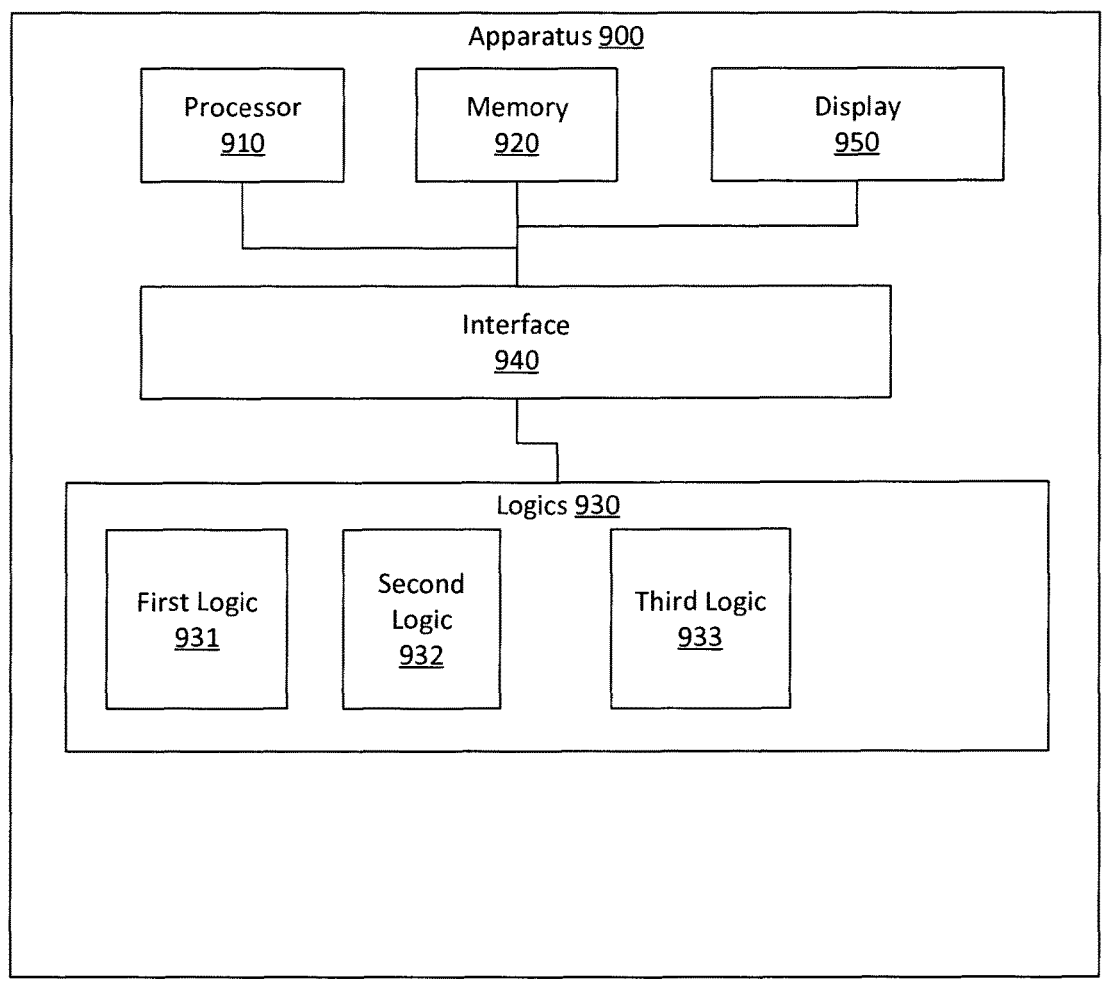
FIG. 9 illustrates an example apparatus for managing an MSSUI.

FIG. 9 illustrates an apparatus 900 that manages a multiple-stage shy user interface. Apparatus 900 may be, for example, a smart phone, a laptop, a tablet, or other computing device. In one example, the apparatus 900 includes a physical interface 940 that connects a processor 910, a memory 920, a touch or hover sensitive display 950, and a set of logics 930. Elements of the apparatus 900 may be configured to communicate with each other, but not all connections have been shown for clarity of illustration. The touch or hover sensitive display may include a proximity detector that includes, for example, capacitive sensors, a depth camera, or other proximity sensing apparatus.

The set of logics 930 manage a multiple stage shy user interface (MSSUI). For example, the set of logics 930 may facilitate navigating an MSSUI, selectively presenting elements from the MSSUI on the apparatus 900, and selectively manipulating effects applied to the displayed user interface elements. Apparatus 900 may include a first logic 931 that handles touch or hover events associated with the display 950. In one embodiment, the first logic 931 handles events including a single touch event, a multi-touch event, a single hover event, a multi-hover event, a touch gesture event, a hover gesture event, or a combined touch and hover event. The different events may be associated with different user interface elements that are already displayed on the display 950 or may be associated with pre-defined regions of the display 950. For example, a user may tap on a user interface element to select that element. Before tapping, a user may hover over the user interface element to get a preview of what other user interface elements may be available through that element in, for example, a lower level of the multi-stage shy user interface hierarchy. Or a user may hover over the user interface element to get a preview of what will happen to some item if the user interface element is activated.

Apparatus 900 may include a second logic 932 that selectively displays on the display 950 a subsequent element from the MSSUI. The subsequent element may be selected based, for example, on the touch or hover events handled by the first logic 931 and on a previous element already displayed on the display 950. When a multiple stage shy user interface is initially being interacted with, there may not be any user interface element displayed. In this initial example, the operating system home screen or some application home screen may be considered to be the previous element or may act as the top level of an MSSUI.

In different embodiments, the second logic 932 may select the subsequent element based on a relationship between a pointer and the display 950 or between the pointer and a previous element. For example, the second logic 932 may choose different subsequent elements based, at least in part, on an angle of an item that produced the touch or hover event. For example, if the pointer is angled to the left of the previous element, the subsequent element may be chosen from the virtual left side of the previous element while if the pointer is angled to the right of the previous element the subsequent element may be chosen from the virtual right side of the previous element. In another example, the element may be chosen based on an earlier or later position in a more general list that otherwise lacks a spatial representation. In one embodiment, the second logic 932 may select the subsequent element based, for example, on a distance from the display 950 of the item that produced the touch or hover event. For example, if the pointer is less than 1 mm from the previous element, then a first subsequent element may be selected while if the pointer is more than 2 mm from the previous element then a second, different subsequent element may be selected. In one embodiment, the second logic 932 may select the subsequent element based, for example, on a movement relative to the display 950 of the item that produced the touch or hover event. For example, if the pointer moves from left to right, then a subsequent element on the virtual right side of the previous element may be selected. In one embodiment, the second logic 932 may select the subsequent element based on an orientation of the pointer with respect to the display 950. For example, if the pointer is pointed below the previous element then the subsequent element may be selected from a lower level of the hierarchy while if the pointer is pointed above the previous element then the subsequent element may be selected from a higher level of the hierarchy. In one embodiment, the second logic 932 may select the subsequent element based, at least in part, on a length of time during which the item that produced the touch or hover event remained in a position, or a speed at which the item that produced the touch or hover event moved with respect to the display 950. For example, if the pointer remained motionless over a single previous element then the subsequent element may be selected from a first small subset of elements associated with the previous element while if the pointer moved quickly near the previous element then the subsequent element may be selected from a second larger subset of elements.

The second logic 932 may add items to the display 950 and may also remove items from the display 950. For example, the second logic 932 may selectively add and remove elements from the display 950 so that less than ten percent of the display is occupied by user interface elements and so that at least twenty five percent of the relative functionality available through a current level of the multi-stage shy user interface is displayed. Different percentages of the display 950 may be selected. In one embodiment, the percentages may be user configurable. Additionally, the second logic 932 may add items to the display 950 or remove items from the display 950 so that only user interface elements that are relevant or that can actually be activated at any given time are displayed. In one embodiment, the second logic 932 may display and remove items from display 950 to maintain the percentage of real estate on display 950 that is covered by user interface elements.

Apparatus 900 may include a third logic 933 that manages a navigation point in the MSSUI. The navigation point may be repositioned based, at least in part, on the touch or hover events, the previous element, and the subsequent element. For example, the navigation point may be moved down a level in a hierarchy associated with the MSSUI when a user generated a touch event on a previous element. The navigation point may be moved up a level in the hierarchy when a user generates a spread or lift event for a previous element. The navigation point may be moved to a specific level associated with an element that is presented via a preview effect when a user makes a gesture or hover event above a previous element.

Apparatus 900 may provide superior results when compared to conventional systems because a smaller portion of the display real estate may be consumed by user interface elements and only relevant user interface elements may be displayed. By covering a smaller portion of the display with user interface elements, more display space is left over to display the content the user is primarily interested in. Only displaying relevant user interface elements while allowing a preview for actions associated with current elements and a preview for lower level elements that may be available simplifies learning and decision making for a user of apparatus 900.

Apparatus 900 may include a memory 920. Memory 920 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 920 may be configured to store remote media session data, user interface data, control data, or other data.

Apparatus 900 may include a processor 910. Processor 910 may be, for example, a signal processor, a microprocessor, an application specific integrated circuit (ASIC), or other control and processing logic circuitry for performing tasks including signal coding, data processing, input/output processing, power control, or other functions. In one embodiment, the apparatus 900 may be a general purpose computer that has been transformed into a special purpose computer through the inclusion of the set of logics 930. Apparatus 900 may interact with other apparatus, processes, and services through, for example, a computer network. In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs).

Figure 10:
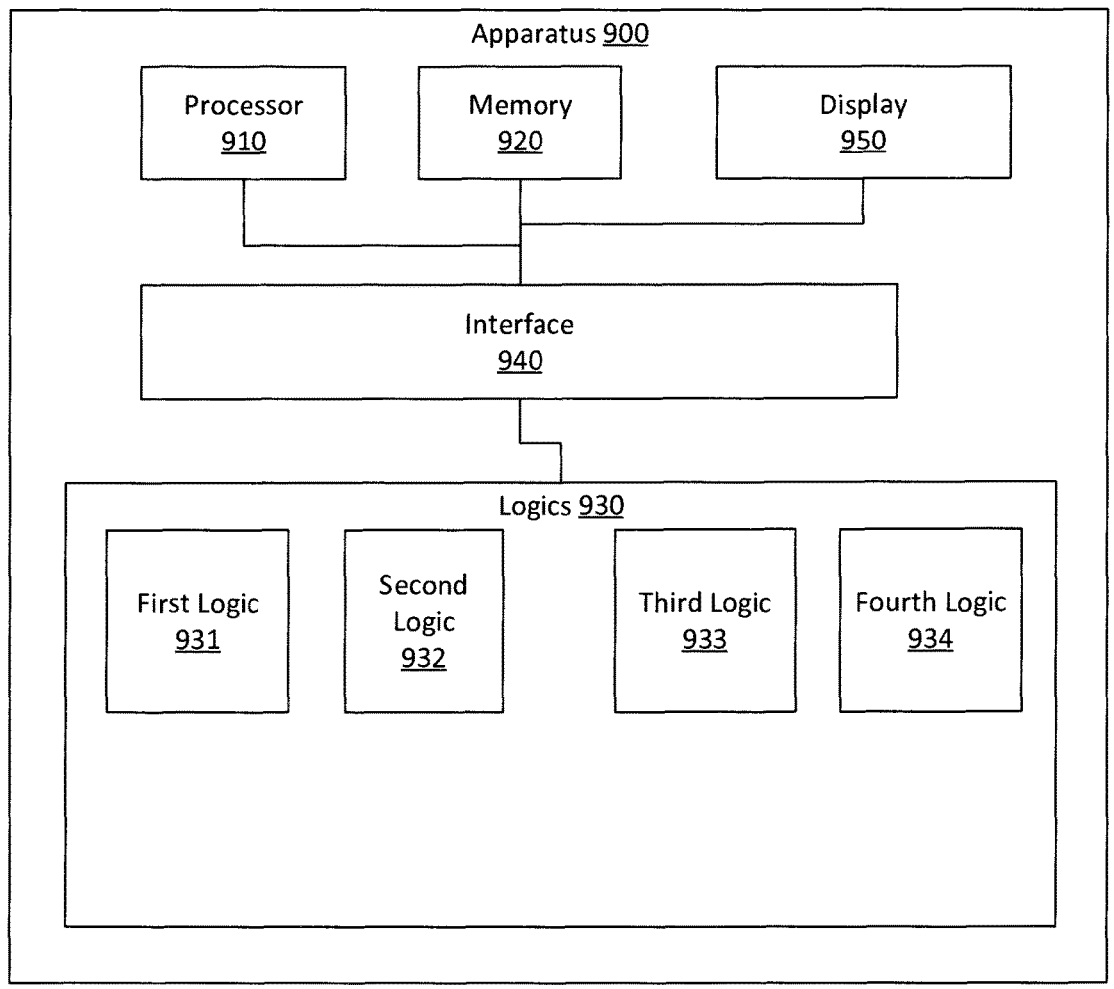
FIG. 10 illustrates an example apparatus for managing an MSSUI.

FIG. 10 illustrates another embodiment of apparatus 900. This embodiment of apparatus 900 includes a fourth logic 934 that selectively applies an effect to the subsequent element. The fourth logic 934 may also selectively apply the effect to a previous element or to some other object on display 950. Which effect is applied may be determined by a position or three dimensional position of the pointer relative to the subsequent element, by an angle of the pointer with respect to the subsequent element, by an orientation of the pointer with respect to the subsequent element, by a movement of the pointer relative to the subsequent element, by a velocity of the pointer relative to the subsequent element, or based on other actions. The effect may take forms including, but not limited to, a light source position effect, a zoom effect, a lens effect, a scroll effect, an animation effect, a preview operation, a reveal next level of multi-stage shy UI effect, or a data reveal effect that reveals a portion of a complex data set.

By way of illustration, the effect may be a light source position effect that is controlled by the distance of the pointer from the display 950, the relative position (e.g., left, right, above, below) of an object on the display 950, and also by the angle at which the pointer is positioned with respect to the object. For example, if the pointer is very close to the display 950 and directly above an object on the display 950 and perpendicular to the object on the display 950, then a pinpoint circle of light that has an angle of incidence of ninety degrees with the object may appear on the object. However, if the pointer is farther away from the display 950, positioned to the side of the object and tilted at an angle, then a larger elliptical area of light that has a lesser angle of incidence with the object may appear on the object. In one embodiment, the light effect may be applied on one side of an object and a corresponding shadow effect may be applied on the opposite side of the object.

By way of further illustration, the effect may be a data reveal effect that reveals a portion of a complex data set. The complex data set may be represented as, for example, a shape in a high-dimensional vector space. The amount of data from the complex data set that is displayed may be controlled by the distance of the pointer from the object. For example, when the pointer is closer to the display 950, less data is displayed while when the pointer is farther away from the display 950, more data is displayed. Additionally, the orientation of a slice of data through the vector space may be selected by the angle of the pointer with respect to the display 950.

Figure 11:
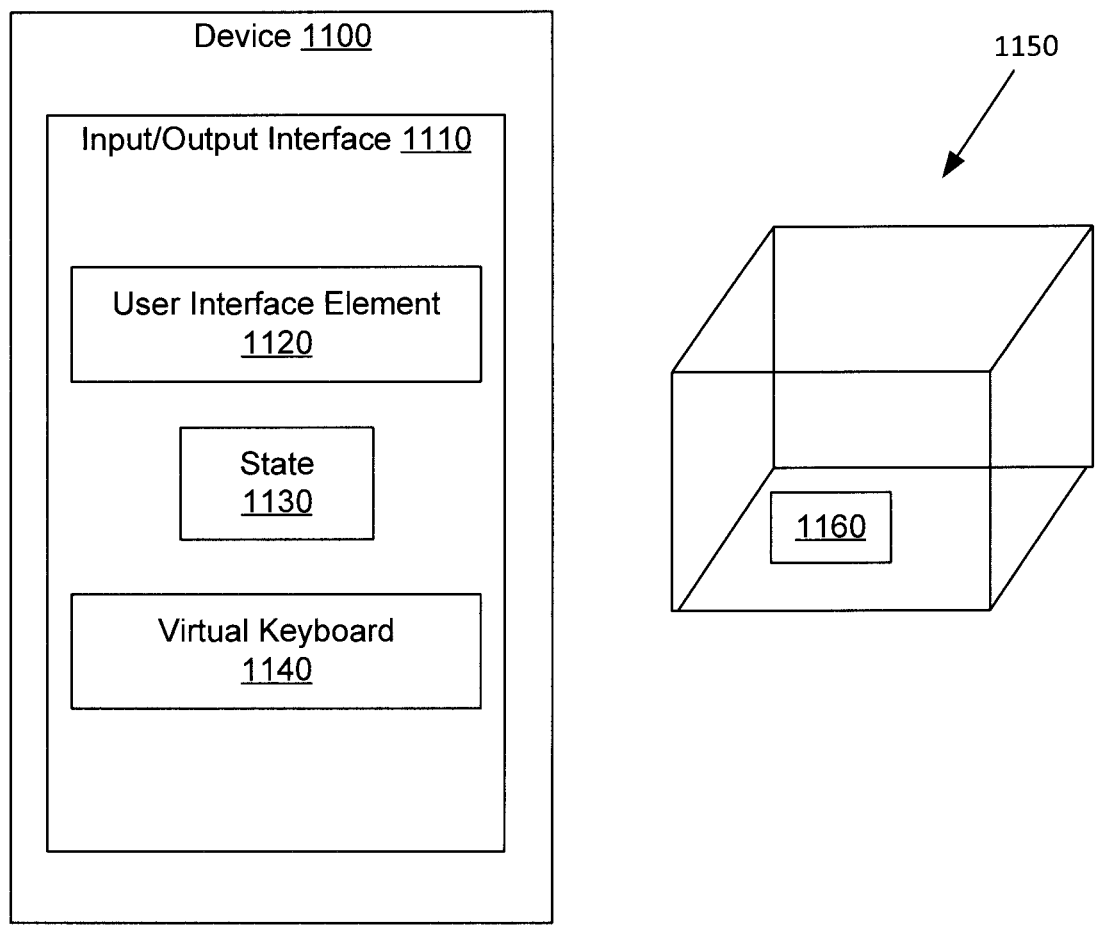
FIG. 11 illustrates an example device having touch and hover sensitivity.

FIG. 11 illustrates an example hover-sensitive device 1100. Device 1100 includes an input/output (i/o) interface 1110. I/O interface 1100 is hover sensitive. I/O interface 1100 may display a set of items including, for example, a virtual keyboard 1140 and, more generically, a user interface element 1120. User interface elements may be used to display information and to receive user interactions. The user interactions may be performed in the hover-space 1150 without touching the device 1100. Device 1100 or i/o interface 1110 may store state 1130 about the user interface element 1120, the virtual keyboard 1140, or other items that are displayed. The state 1130 of the user interface element 1120 may depend on an action performed using virtual keyboard 1140. The state 1130 may include, for example, the location of an object designated as being associated with a primary hover point, the location of an object designated as being associated with a non-primary hover point, or other information. Which user interactions are performed may depend, at least in part, on which object in the hover-space is considered to be the primary hover-point.

The device 1100 may include a proximity detector that detects when an object (e.g., digit, pencil, stylus with capacitive tip) is close to but not touching the i/o interface 1110. The proximity detector may identify the location (x, y, z) of an object 1160 in the three-dimensional hover-space 1150. The proximity detector may also identify other attributes of the object 1160 including, for example, the speed with which the object 1160 is moving in the hover-space 1150, the type (e.g., finger, stylus) of object 1160, the orientation (e.g., pitch, roll, yaw) of the object 1160 with respect to the hover-space 1150, the direction in which the object 1160 is moving with respect to the hover-space 1150 or device 1100, a gesture being made by the object 1160, or other attributes of the object 1160. While a single object 1160 is illustrated, the proximity detector may detect more than one object in the hover-space 1150. The location and movements of object 1160 may be considered when deciding which user interface elements from an MSSUI are to be displayed and what effects are to be applied to the user interface elements.

In different examples, the proximity detector may use active or passive systems. For example, the proximity detector may use sensing technologies including, but not limited to, capacitive, electric field, inductive, Hall effect, Reed effect, Eddy current, magneto resistive, optical shadow, optical visual light, optical infrared (IR), optical color recognition, ultrasonic, acoustic emission, radar, heat, sonar, conductive, and resistive technologies. Active systems may include, among other systems, infrared or ultrasonic systems. Passive systems may include, among other systems, capacitive or optical shadow systems. In one embodiment, when the proximity detector uses capacitive technology, the detector may include a set of capacitive sensing nodes to detect a capacitance change in the hover-space 1150. The capacitance change may be caused, for example, by a digit(s) (e.g., finger, thumb) or other object(s) (e.g., pen, capacitive stylus) that comes within the detection range of the capacitive sensing nodes. In another embodiment, when the proximity detector uses infrared light, the proximity detector may transmit infrared light and detect reflections of that light from an object within the detection range (e.g., in the hover-space 1150) of the infrared sensors. Similarly, when the proximity detector uses ultrasonic sound, the proximity detector may transmit a sound into the hover-space 1150 and then measure the echoes of the sounds. In another embodiment, when the proximity detector uses a photodetector, the proximity detector may track changes in light intensity. Increases in intensity may reveal the removal of an object from the hover-space 1150 while decreases in intensity may reveal the entry of an object into the hover-space 1150.

In general, a proximity detector includes a set of proximity sensors that generate a set of sensing fields in the hover-space 1150 associated with the i/o interface 1110. The proximity detector generates a signal when an object is detected in the hover-space 1150. In one embodiment, a single sensing field may be employed. In other embodiments, two or more sensing fields may be employed. In one embodiment, a single technology may be used to detect or characterize the object 1160 in the hover-space 1150. In another embodiment, a combination of two or more technologies may be used to detect or characterize the object 1160 in the hover-space 1150.

Figure 12:
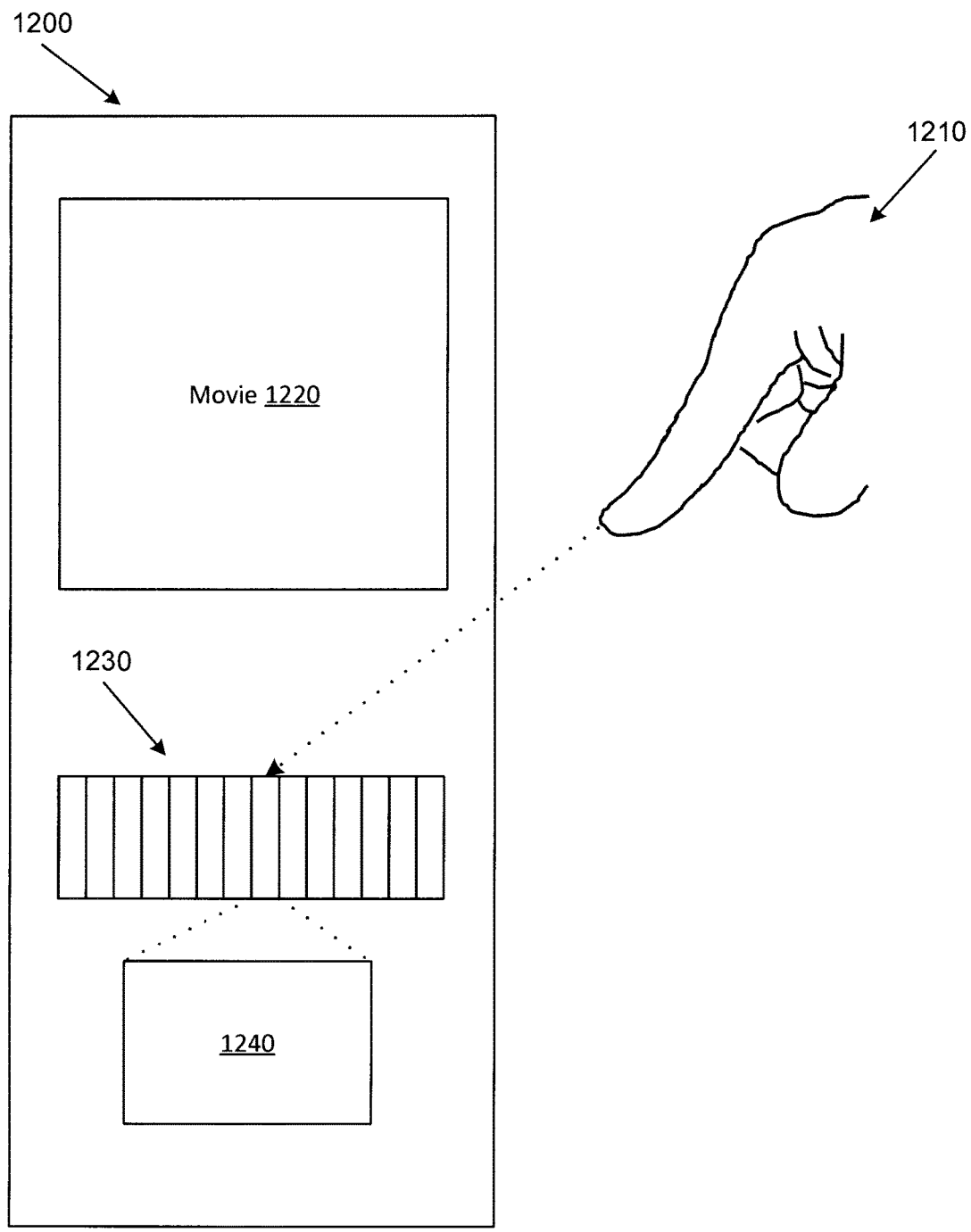
FIG. 12 illustrates an example device displaying a first preview associated with a user interface element in an MSSUI.

FIG. 12 illustrates a device 1200 on which a movie 1220 is being displayed. A user finger 1210 has been brought close enough to device 1200 to reveal a frame picker user interface element 1230. In FIG. 12, the user finger 1210 is pointed at a location near the middle of the element 1230 and thus a single frame is displayed in a freeze frame mode in a frame viewer user interface element 1240.

Figure 13:
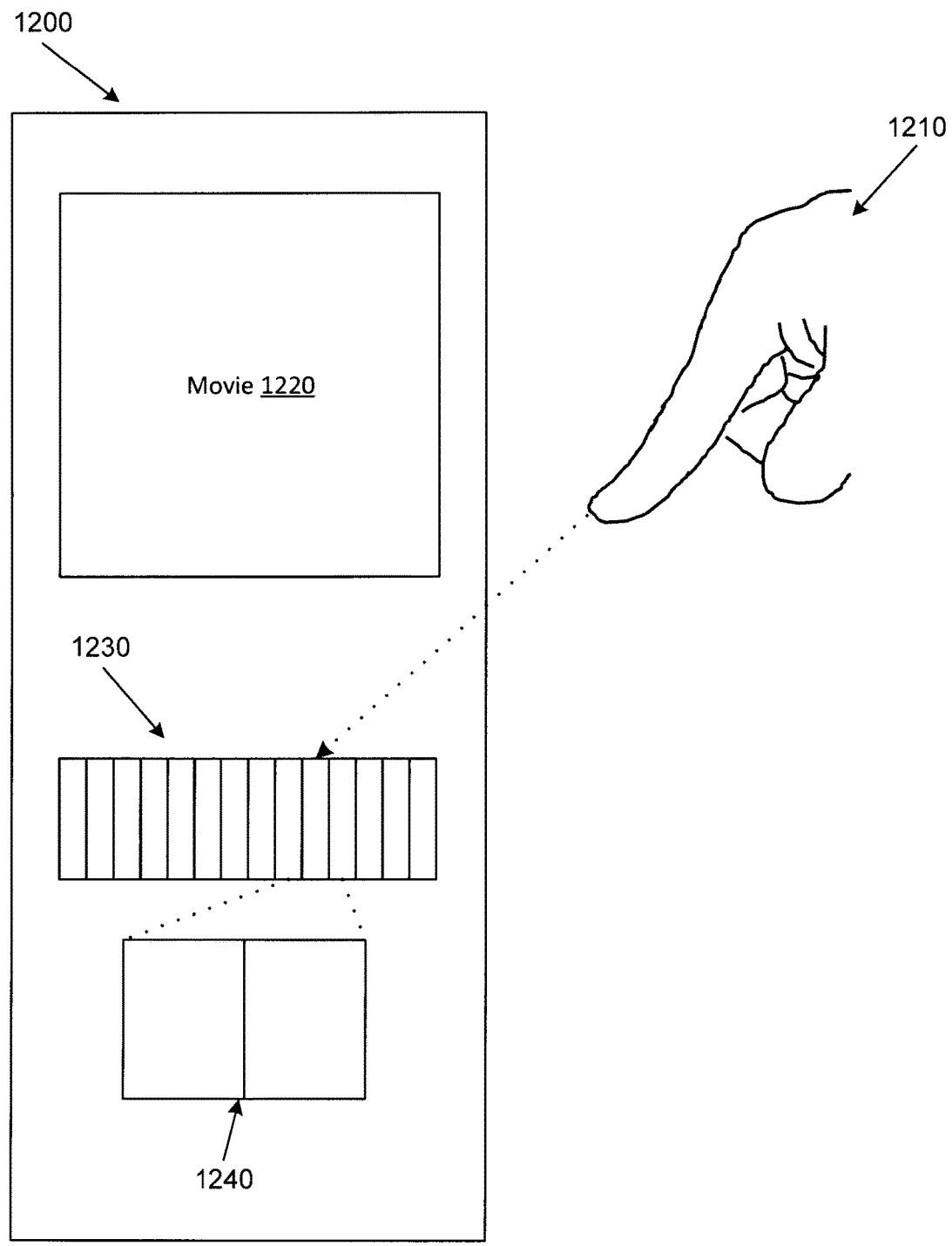
FIG. 13 illustrates an example device displaying a preview associated with a user interface element in an MSSUI.

FIG. 13 illustrates finger 1210 pointing slightly to the right of center of element 1230. In this example, a different effect is produced for element 1230. For example, instead of showing a single frame in freeze frame mode in element 1240, a pair of frames that are slowly scrolling from right to left may be presented in element 1240.

Figure 14:
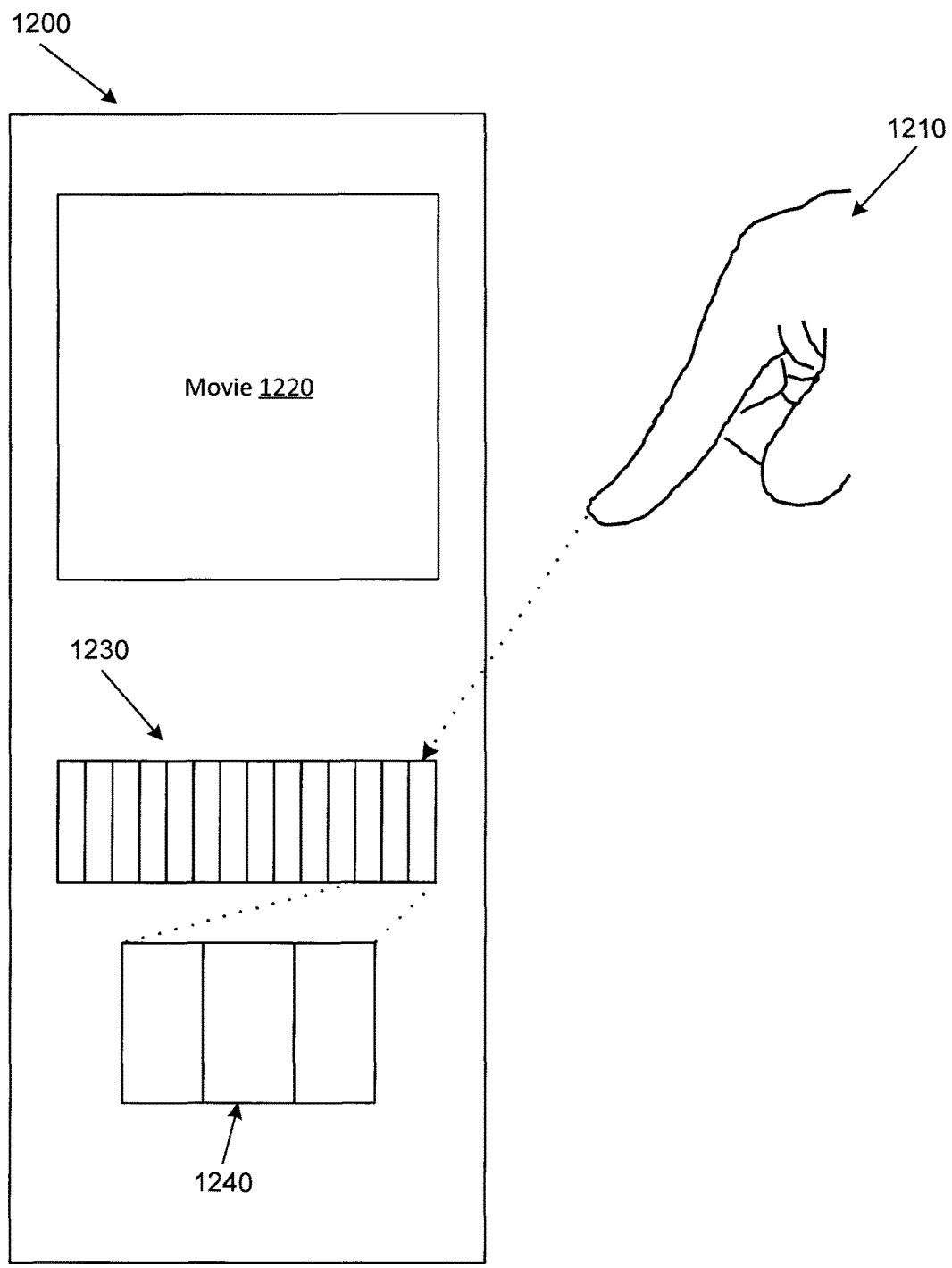
FIG. 14 illustrates an example device displaying a deeper preview effect associated with a user interface element from an MSSUI.

FIG. 14 illustrates finger 1210 pointing to the right side of element 1230. In this example, another different effect is produced for element 1230. For example, instead of showing a single frame or a pair of slowly scrolling frames, a set (e.g., three) of frames that are scrolling by in a pseudo real-time mode may be presented.

In one embodiment, the angle of finger 1210 may control the rate at which frames are scrolled. For example, when finger 1210 is perpendicular to element 1240, then frames may be frozen but as the angle between the device 1200 and finger 1210 decreases, the scroll rate may increase. In one embodiment, element 1230 may be removed while element 1240 is being used.

FIGS. 12-14 illustrate a single user interface element 1230 that has at least three different shy sub-elements available. The different shy sub-elements include a freeze frame viewer, a slow motion viewer, and a pseudo real-time viewer. The three different shy sub-elements are selected by interacting with different portions of element 1230. Other shy sub-elements may be selected from other user interface elements in similar ways.

Figure 15:
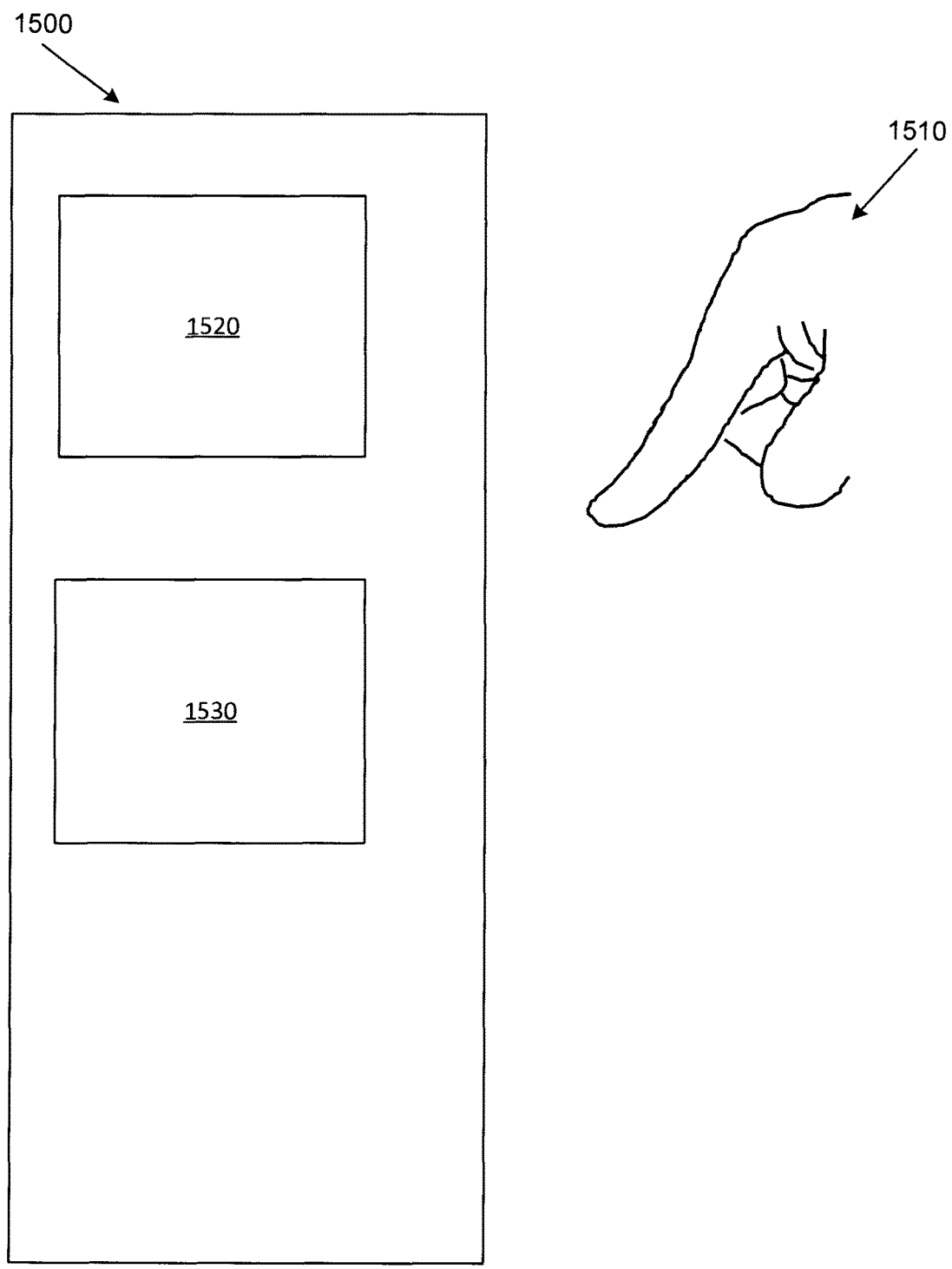
FIG. 15 illustrates an example device displaying a user interface.

FIG. 15 illustrates a device 1500 on which two user interface elements are displayed. Element 1520 may be, for example, a tile that indicates that it is associated with a productivity application (e.g., word processor). Element 1530 may be, for example, a tile that indicates that is associated with a photo album. Since finger 1510 has not approached to within a threshold distance of device 1500, the user interface elements 1520 and 1530 simply reveal their top level information. While the top level information is displayed, the user interface elements 1520 and 1530 may have hidden MSSUI.

Figure 16:
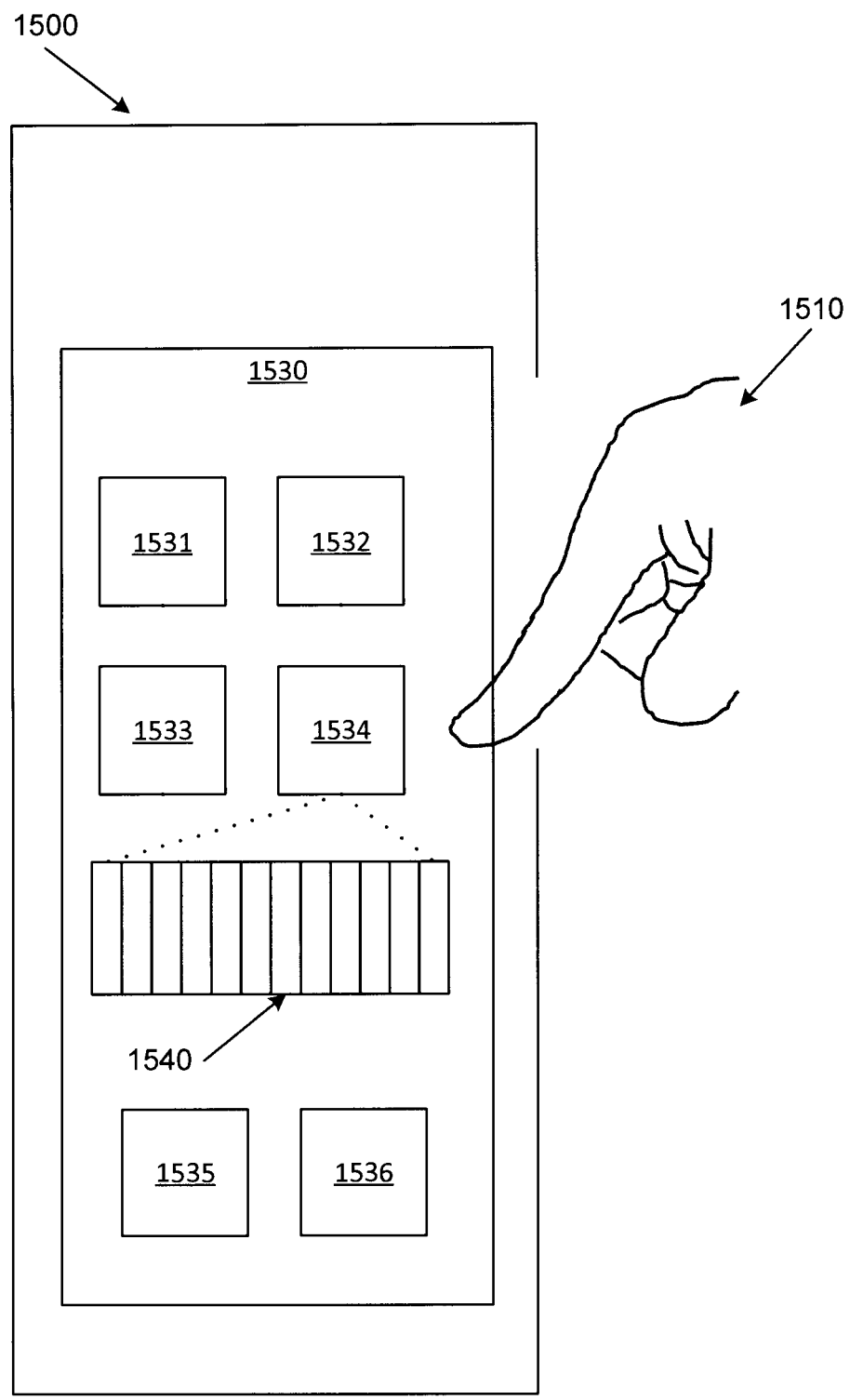
FIG. 16 illustrates an example device displaying a user interface.

FIG. 16 illustrates device 1500 after finger 1510 has approached to within a threshold distance of user interface element 1530. Folders 1531, 1532, 1533, 1534, 1535, and 1536 have been displayed. A photo viewer 1540 has also been displayed. The photos displayed in viewer 1540 may be associated with a folder (e.g., 1534) at which finger 1510 is pointing. Viewer 1540 may order photographs by, for example, the date they were taken, the data they were accessed, or in other orders.

Figure 17:
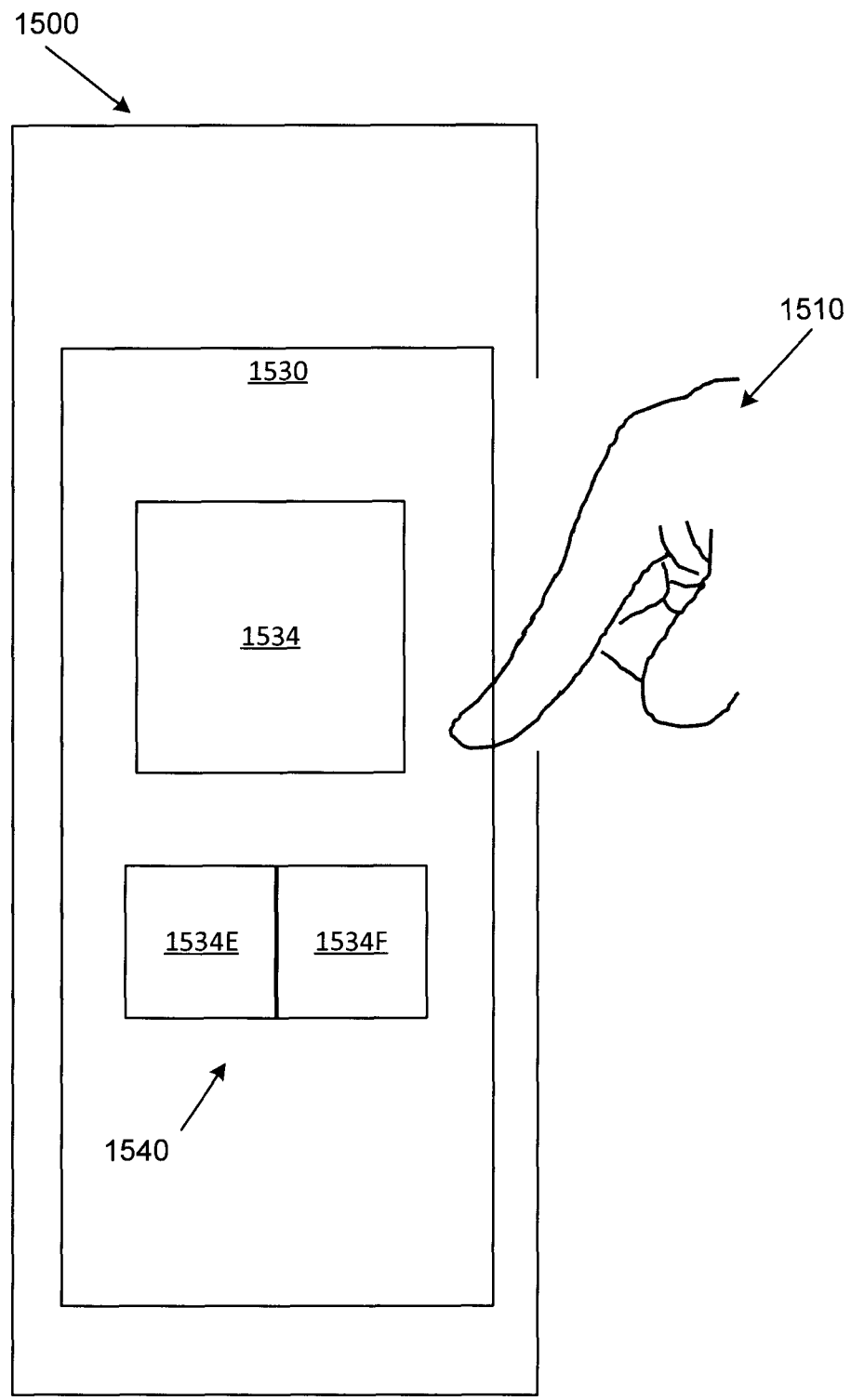
FIG. 17 illustrates an example device displaying a user interface.

FIG. 17 illustrates device 1500 after finger 1510 has approached even closer to folder 1534 and has interacted with viewer 1540. Individual photos 1534E and 1534F are illustrated in a larger size than were the thumbnails in viewer 1540. Whether a previous photo (e.g., 1534D) or a subsequent photo (e.g., 1534G) will be presented next may depend on the angle of finger 1510, a direction in which finger 1510 moves, or other touch or hover related actions.

Thus, FIGS. 15-17 illustrate how relevant portions of a shy user interface may be progressively surfaced with irrelevant portions being removed to facilitate improved interaction with a device.

Aspects of Certain Embodiments

In one embodiment, an apparatus includes a processor, a memory, and a set of logics. The apparatus may include a physical interface to connect the processor, the memory, and the set of logics. The set of logics manage a multiple stage shy user interface (MSSUI). For example, the set of logics may handle touch or hover events associated with the display and, in response to the touch or hover events, may selectively display a first element followed by subsequent elements from the MSSUI. The first and subsequent elements may be selected based on the touch or hover events and on previous elements already displayed on the display. The logics may also manage a navigation point in the MSSUI based, at least in part, on the touch or hover events, the previous element, and the subsequent element. The logics may also manage effects that are applied to user interface elements or objects displayed on the display.

In another embodiment, a method includes presenting multi-stage shy user interface (UI) elements on a display on a device. The method includes receiving first electronic indicia of a user's intent to interact with a first level of the multi-stage shy UI and selectively displaying on the display a first element that was not previously displayed on the display. The first element is associated with the first level and is selected based, at least in part, on the first electronic indicia and a user interaction context. The method also includes receiving second electronic indicia of the user's intent to interact with a second, different level of the multi-stage shy UI and selectively displaying on the display a second element that is not currently displayed on the display. The second element is associated with a portion of the second level and is selected based, at least in part, on the second electronic indicia and the context. The portion of the second level depends, at least in part, on the first element. The method also includes receiving third electronic indicia of the user's intent to apply an effect to the first element, the second element, or to an object displayed on the display and selectively applying the effect to the first element, to the second element, or to the object. The effect is based, at least in part, on the third electronic indicia and the user interaction context.

In another embodiment, a system includes a display on which an element from a multi-stage shy user interface is displayed. The element may be, for example, a user interface icon. The system also includes a proximity detector (e.g., capacitive elements, depth camera) that detects actions (e.g., hover events, touch events) in a space associated with the display. The system also includes a user interface circuit that controls the presentation and appearance of user interface elements from the multi-stage shy user interface in response to the detected actions. The circuit may control the display so that less than five percent of the display is occupied by user interface elements and so that at least ten percent of the functionality available through the multi-stage shy user interface is displayed.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting multi-stage shy user interface (UI) elements on a display on a device, comprising:
   receiving first electronic indicia of a user's intent to interact with a current context associated with the device;
   selectively displaying on the display a first element that is not currently displayed on the display, where the first element is associated with a first level of a multi-stage shy UI, and where the first element is selected based, at least in part, on the first electronic indicia and a user interaction context;
   receiving second electronic indicia of the user's intent to interact with a second, different level of the multi-stage shy UI;
   selectively displaying on the display a second element that is not currently displayed on the display, where the second element is associated with a portion of the second level, where the second element is selected based, at least in part, on the second electronic indicia and the context, and where the portion of the second level depends, at least in part, on the first element;
   receiving third electronic indicia of the user's intent to apply an effect to the first element, the second element, or to an object displayed on the display; and
   selectively applying the effect to the first element, to the second element, or to the object, where the effect is based, at least in part, on the third electronic indicia and the user interaction context, and wherein the effect is a data reveal effect that reveals a portion of a complex data set, wherein the amount of data from the complex data set that is displayed is controlled by a distance of a pointer, in three-dimensional hover-space above the display, from the display.

2. The method of claim 1, the first electronic indicia comprising a hover event generated in response to the pointer approaching the display or the pointer pointing to a pre-defined portion of the display.

3. The method of claim 2, the first electronic indicia comprising a touch event generated in response to the pointer touching the display, a gesture event generated in response to the pointer making a touch or hover gesture associated with the display, a tactile event generated in response to the user moving the device, or a speech event generated in response to the user verbally interacting with the device.

4. The method of claim 3, the second electronic indicia comprising a hover event generated in response to the pointer approaching the display, in response to the pointer maintaining a relationship with the first element, in response to the pointer pointing to a pre-defined location on the display, or in response to the pointer establishing a relationship with an object displayed on the display.

5. The method of claim 4, the second electronic indicia comprising a touch event generated in response to the pointer touching the display, a gesture event generated in response to the pointer making a touch or hover gesture associated with the display, a tactile event generated in response to the user moving the device, or a speech event generated in response to the user verbally interacting with the device.

6. The method of claim 3, wherein the third electronic indicia comprises a hover event generated in response to the pointer approaching the display, in response to the pointer maintaining a relationship with the first element, in response to the pointer pointing to a pre-defined location on the display, or in response to the pointer establishing a relationship with one or more objects displayed on the display.

7. The method of claim 6, the third electronic indicia comprising a touch event generated in response to the pointer touching the display, a gesture event generated in response to the pointer making a touch or hover gesture associated with the display, a tactile event generated in response to the user moving the device, or a speech event generated in response to the user verbally interacting with the device.

8. The method of claim 1, where the user interaction context is determined, at least in part, by a set of objects currently displayed on the display, and where the user interaction context concerns a task being performed on the device by the user.

9. The method of claim 1, where the user interaction context is determined, at least in part, by a relationship between the pointer and an object displayed on the display, and where the user interaction context concerns a task being performed on the device as controlled, at least in part, by the user.

10. The method of claim 6, where the effect is a light source position effect, a zoom effect, a lens effect, a scroll effect, an animation effect, a preview operation, or a reveal next level of multi-stage shy UI effect.

11. The method of claim 6, where the effect is determined, at least in part, by a position of the pointer, a three dimensional position of the pointer, an angle of the pointer, an orientation of the pointer, a movement of the pointer, or a velocity of the pointer.

12. The method of claim 1, where the portion is selected based on a position of the pointer with respect to an object that represents the complex data set, an angle of the pointer with respect to an object that represents the complex data set, an orientation of the pointer with respect to an object that represents the complex data set, a movement of the pointer with respect to an object that represents the complex data set, or a velocity of the pointer with respect to an object that represents the complex data set.

13. The method of claim 1, comprising:
upon receiving subsequent electronic indicia of the user's intent to interact with a subsequent level of the multi-stage shy UI, selectively displaying on the display a subsequent element that is not currently displayed on the display, where the subsequent element is associated with a portion of a subsequent level of the multi-stage shy UI, where the portion depends on a previous element displayed on the display, and where the subsequent element is selected based on the subsequent electronic indicia, the previous element, and the user interaction context.

14. An apparatus, comprising:
a processor;
a touch or hover sensitive display;
a memory;
a set of logics that manage a multiple stage shy user interface (MSSUI), and
a physical interface to connect the processor, the memory, the display, and the set of logics,
the set of logics comprising:
a first logic that handles touch or hover events associated with the display;
a second logic that selectively displays on the display a subsequent element from the MSSUI, where the subsequent element is selected based on the touch or hover events and on a previous element already displayed on the display,
a third logic that manages a navigation point in the MSSUI based, at least in part, on the touch or hover events, the previous element, and the subsequent element, and
a fourth logic that selectively applies an effect to the subsequent element, wherein the effect is a data reveal effect that reveals a portion of a complex data set, wherein the amount of data from the complex data set that is displayed is controlled by a distance of a pointer, in three-dimensional hover-space above the display, from the display.

15. The apparatus of claim 14, where the first logic handles events including a single touch event, a multi-touch event, a single hover event, a multi-hover event, a touch gesture event, a hover gesture event, or a combined touch and hover event.

16. The apparatus of claim 15, where the second logic selects the subsequent element based, at least in part, on an angle of an item that produced the touch or hover event, a distance from the display of the item that produced the touch or hover event, a movement relative to the display of the item that produced the touch or hover event, an orientation with respect to the display of the item that produced the touch or hover event, a length of time during which the item that produced the touch or hover event remained in a position, or a speed at which the item that produced the touch or hover event moved with respect to the display.

17. The apparatus of claim 16, where the second logic selectively displays elements on the display and selectively removes elements from the display so that less than ten percent of the display is occupied by user interface elements and so that at least twenty five percent of the relevant functionality available through a current level of the multi-stage shy user interface is displayed.

18. The apparatus of claim 17, where the effect is determined by a position of the pointer relative to the subsequent element, an angle of the pointer with respect to the subsequent element, an orientation of the pointer with respect to the subsequent element, a movement of the pointer relative to the subsequent element, or a velocity of the pointer relative to the subsequent element.

19. The apparatus of claim 18, where the effect is a light source position effect, a zoom effect, a lens effect, a scroll effect, an animation effect, a preview operation, a reveal next level of multi-stage shy UI effect, or a data reveal effect that reveals a portion of a complex data set.

20. A system, comprising:
a display on which an element from a multi-stage shy user interface is displayed;
a proximity detector that detects actions in a space associated with the display, and
a user interface circuit that controls the presentation and appearance of user interface elements from the multi-stage shy user interface in response to the detected actions so that less than five percent of the display is occupied by user interface elements and so that at least ten percent of the functionality available through the multi-stage shy user interface is displayed, and that selectively applies an effect to a subsequent element, wherein the effect is a data reveal effect that reveals a portion of a complex data set, wherein the amount of data from the complex data set that is displayed is controlled by a distance of a pointer, in three-dimensional hover-space above the display, from the display.

* * * * *